Jan. 20, 1931.                 C. L. GEORGE                  1,789,814
                    ENDLESS TRACK TREAD FOR VEHICLES
                    Filed April 29, 1929      2 Sheets-Sheet 2
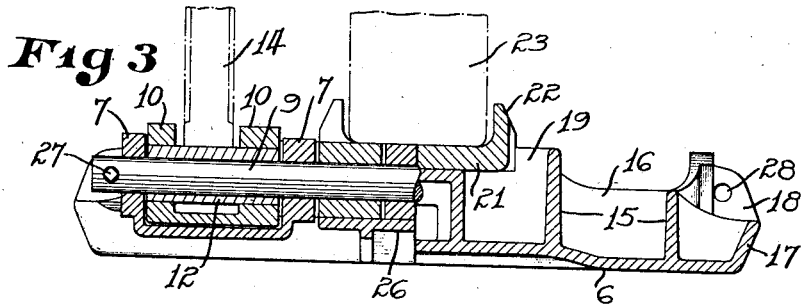
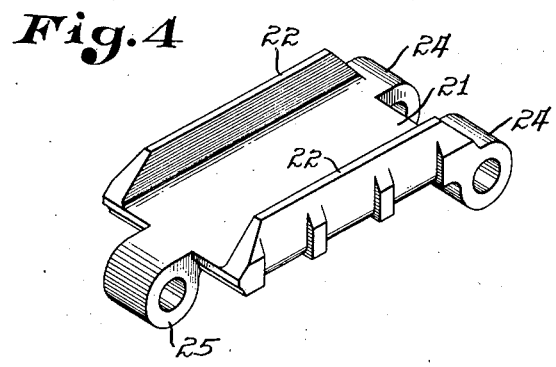
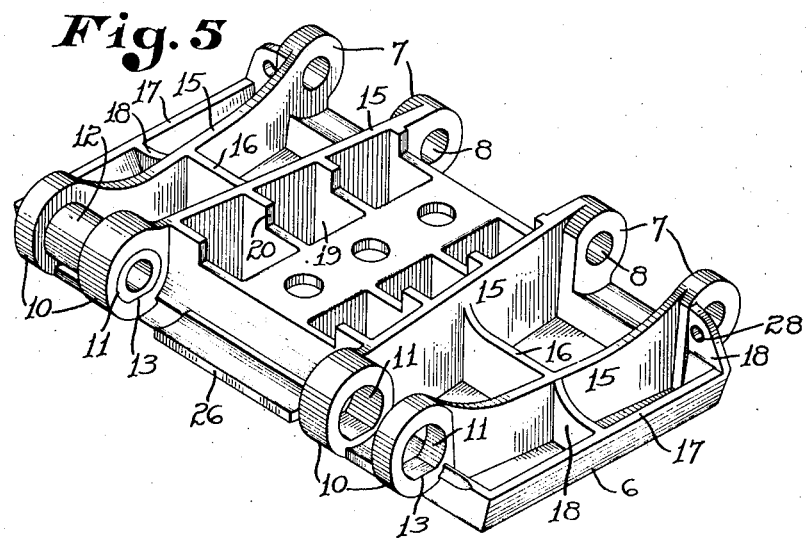
Inventor
Charles L. George,
By Owen + Owen
Attorneys Patented Jan. 20, 1931

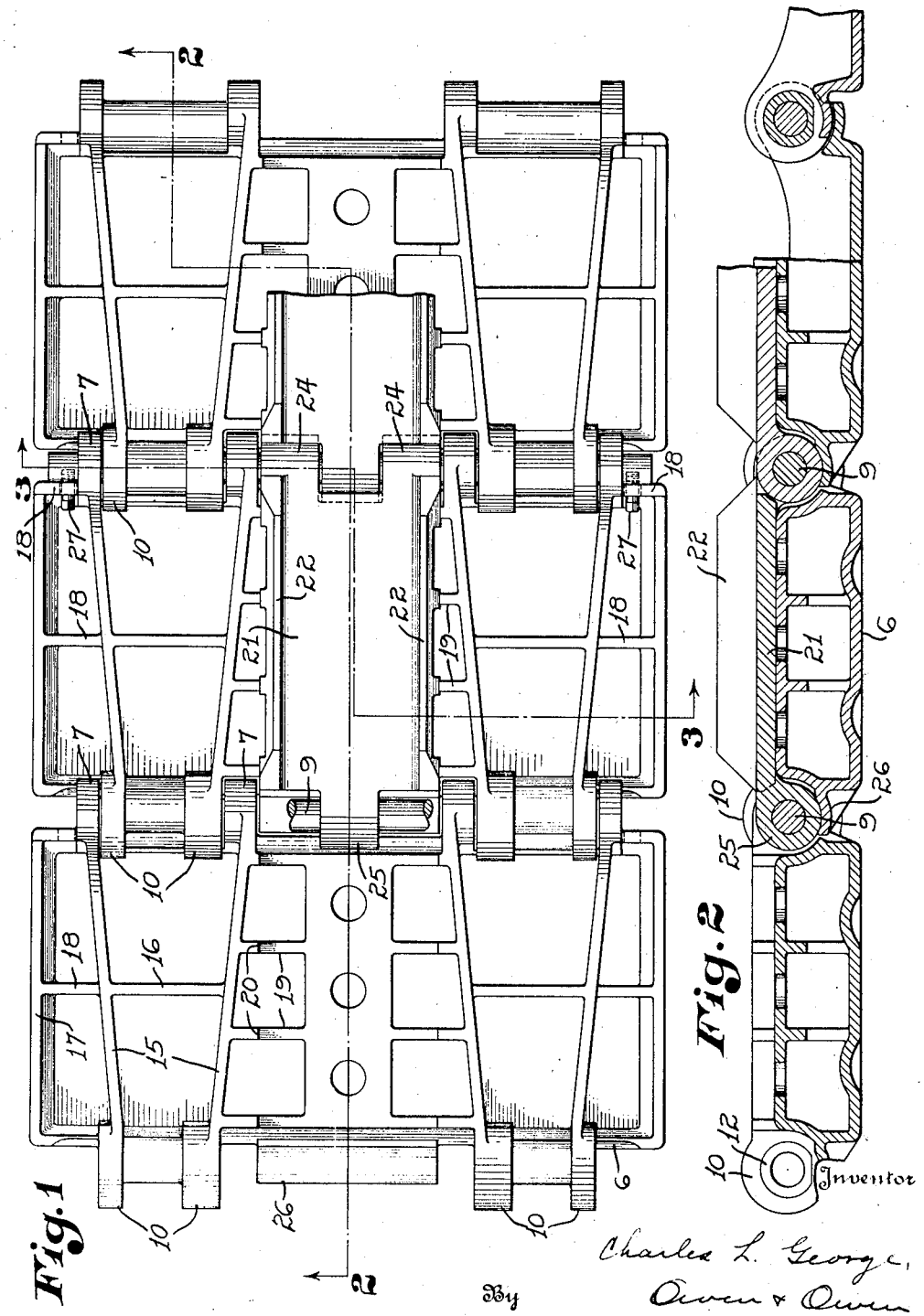

1,789,814

UNITED STATES PATENT OFFICE

CHARLES L. GEORGE, OF FINDLAY, OHIO, ASSIGNOR TO THE BUCKEYE TRACTION DITCHER COMPANY, OF FINDLAY, OHIO, A CORPORATION OF OHIO

ENDLESS TRACK TREAD FOR VEHICLES

Application filed April 29, 1929. Serial No. 358,779.

This invention relates to an endless track tread primarily adapted to be used on a vehicle in which the tread passes about and supports the load carrying wheels. Such endless track treads include a series of ground engaging elements, so mounted and connected that they are adapted to ride over and be driven by sprocket wheels, and in connection therewith, a series of track channels adapted to ride over and engage rollers that prevent relative lateral movement of the track tread.

The general object of the present invention is to provide an endless track tread for the purpose stated, which may be easily assembled, in which wear is reduced to a minimum, and in which the wear that does occur is for the most part confined to relatively small and inexpensive replacable elements.

The specific construction of the various novel features of the invention and advantages resulting therefrom, will be more particularly explained in connection with the accompanying drawings, which illustrate the preferred embodiment thereof.

In the drawings:

Figure 1 is an inner plan view of a portion of a track tread constructed in accordance with the invention.

Figure 2 is a section taken substantially on the line 2—2 of Figure 1.

Figure 3 is a section taken substantially on the line 3—3 of Figure 1.

Figure 4 is a perspective view of one of the channel track elements.

Figure 5 is a perspective view of one of the ground engaging elements.

As illustrated in the drawings, the endless track tread, to which the invention relates, comprises a series of links, with each link including a ground engaging member 6 and a channel track member 21 nested therein midway between the side edges thereof. In referring to the dimensions of these elements, the length will be regarded as taken in the direction of travel. In the present embodiment thereof, the width of the ground engaging elements is materially greater than the length.

Each ground engaging element 6 is formed at one end with two pairs of ears 7 formed with transversely aligned openings 8 which are adapted to receive a pivot pin 9. The opposite end of the ground engaging element 6 is formed with corresponding pairs of ears 10, with each pair so arranged that it is adapted to be received between the adjacent ears 7 of the next succeeding ground engaging element. The two pairs of ears 10 are provided with aligned openings 11, each pair being adapted to receive a bushing 12. A flat face 13 is formed on one side to prevent relative rotation of the bushing with relation to the ears in which it is mounted. The bushings 12 in each engaging element have aligned openings of the same diameter as the openings 8 and are adapted to receive the pin 9 which is mounted on the ears 17 of the next successive ground engaging element, thus constituting the means for pivotally connecting two adjacent links. Each of the bushings 12 is adapted to be engaged by a sprocket wheel 14 over which the endless track tread passes and which is driven in the usual manner to cause the vehicle to travel over the ground.

The ground engaging elements 6 are formed from steel or other suitable metal and may be of shell-like construction, with reinforcing flanges 15 connecting the ears 7 with the corresponding ears 10 along the line where the greatest stress occurs, the flanges 15 being connected by a cross web 16. The edges of the ground engaging element may also be formed with reinforcing flanges 17 suitably braced by webs 18.

It will be noted that there are a pair of ears 7 and a corresponding pair of ears 10 at each side of the ground engaging element and it will be understood that there are likewise driving sprockets 14. The space between the two inner flanges 15 is crossed by reinforcing flanges 19 which are formed with opposed shoulders 20, providing a seat within which the channel track element 21 is nested. This channel track element is provided with opposed longitudinal flanges 22 by means of which the track tread is guided over rollers 23 located in a plane between the two drive sprockets 14 thereby supporting the tread and preventing relative lateral movement thereof. Each channel track element 21 is formed at one end with two ears 24 and at the other end with a corresponding ear 25 adapted to be received between the two ears 24 of the next succeeding channel track element. Both the ears 24 and ears 25 are provided with openings of the same diameter as the openings 8 in the ears 7. When the channel track members are properly nested in the ground engaging members, the openings in the ears 24 and 25 are in alignment with the openings in the corresponding ears 7 and with the openings through the bushings 12, so that the pins 9 serve to lock each channel track element within the corresponding ground engaging element and also to pivotally connect these two elements to the corresponding elements in the next succeeding link. The bushings 12 take the thrust of the drive sprockets 14 and both the bushings 12 and the pins 9 are protected from injury in contact with the ground by curved flanges 26 which extend from the edges of the ground engaging elements.

Each pin 9 is non-rotatably held in the ears 7 by a set screw 27 extending through a hole 28 in one of the webs 18 or by other suitable means. Also each bushing 12 is non-rotatably held in the ears 10 by reason of the flat face 13. As a consequence, practically all of the wear resulting from the driving of the endless track tread is sustained by the pins 9 and the bushings 12. These elements may be replaced at a trifling cost. The channel track elements 21, which also receive some wear, may be easily replaced without incurring the expense of replacing the ground engaging thread elements. Thus the expense of upkeep is reduced to a minimum and the various parts of the device may be assembled or replaced with the utmost facility.

While I have shown and described in considerable detail the preferred embodiment of the invention, it will be understood that the same may be considerably modified without departing from the spirit and scope of the invention as defined in the claims.

What I claim is:

1. In a device of the character described, a succession of like links, each link comprising a ground engaging element and a channel track element nested within the same, and a single pivot pin uniting the two elements of one link to each other and likewise uniting these two elements respectively to the corresponding elements of the next succeeding link.

2. In a device of the character described, a succession of links, each link comprising a ground engaging element and a channel track element, the ground engaging element having on its inside face transverse reinforcing flanges with portions cut away to form opposed shoulders between which the channel track element is seated, a bushing non-rotatably mounted in an end of an element of one link and engageable by a drive wheel, and a pivot pin passing through said bushing and non-rotatably mounted in the adjacent end of an element of the next succeeding link, said pivot pin also passing through and constituting a pivotal connection between the adjacent ends of the other elements of said links.

3. In a device of the character described, a succession of like links, each link comprising a ground engaging element and a channel track element nested within the same, a bushing non-rotatably mounted in one end of a ground engaging element of one link and engageable by a drive wheel, and a pivot pin passing through said bushing and non-rotatably mounted in the adjacent end of the ground engaging element of the next succeeding link, said pivot pin also passing through and constituting a pivotal connection between the adjacent ends of the channel track elements of said links.

4. In a device of the character described, a succession of links, each link comprising a ground engaging element and a channel track element nested within the same midway between the side edges thereof, a pair of transverse aligned bushings non-rotatably mounted in one end of the ground engaging element on opposite sides of the channel track element and engageable by drive wheels, a pivot pin passing through said aligned bushing and non-rotatably mounted in the adjacent end of the next succeeding ground engaging element, said pivot pin also passing through and constituting a pivotal connection between the adjacent ends of the channel track elements of the links.

5. In a device of the character described, a succession of like links, each link comprising a ground engaging element and a channel track element nested within the same, and a single pivot pin uniting the two elements of one link to each other and likewise uniting these two elements respectively to the corresponding elements of the next succeeding link, each channel track element being formed with abutments in opposed relation so as to receive between them a roller about which the tread travels and by which it is held against material lateral movement, each ground engaging element being formed on each side of the channel track element with a pair of spaced lugs through which the pivot pin passes, the portion of the pin between the lugs of each pair being engageable by the teeth of a drive sprocket.

In testimony whereof I have hereunto signed my name to this specification.

CHARLES L. GEORGE.